United States Patent [19]

Fruh

[11] Patent Number: 4,665,950

[45] Date of Patent: May 19, 1987

[54] MEDIUM-CARRYING LINE HAVING AT LEAST ONE RESTRICTOR

[75] Inventor: Walter Fruh, Winterthur, Switzerland

[73] Assignee: Sulzer Brothers Limited, Winterthur, Switzerland

[21] Appl. No.: 733,507

[22] Filed: May 10, 1985

[30] Foreign Application Priority Data

May 16, 1984 [CH] Switzerland ............... 2403/84

[51] Int. Cl.⁴ .................................. F15D 1/02
[52] U.S. Cl. ...................... 138/44; 138/40; 138/45
[58] Field of Search ............ 138/44, 45, 103, 108, 138/109, 178, 40

[56] References Cited

U.S. PATENT DOCUMENTS

| | | | |
|---|---|---|---|
| 1,503,371 | 7/1924 | Meyer | 138/44 X |
| 1,796,651 | 3/1931 | Harty et al. | 138/113 |
| 1,824,717 | 9/1931 | Harty et al. | 138/113 X |
| 2,658,530 | 11/1953 | Kaiser | 138/113 X |
| 3,774,645 | 11/1973 | Pompa | 138/44 |

FOREIGN PATENT DOCUMENTS 2060937  5/1981  United Kingdom ............... 138/44

*Primary Examiner*—James E. Bryant, III
*Attorney, Agent, or Firm*—Kenyon & Kenyon

[57] ABSTRACT

A restrictor which is in the form of a perforated disc is mounted within the cylindrical line by a plurality of circumferentially disposed pins so as to define a gap between the disc and the line. Thermal expansion of the disc caused by a heated medium flowing through the disc causes the disc to expand radially without transferring thermal stresses into the line.

14 Claims, 3 Drawing Figures

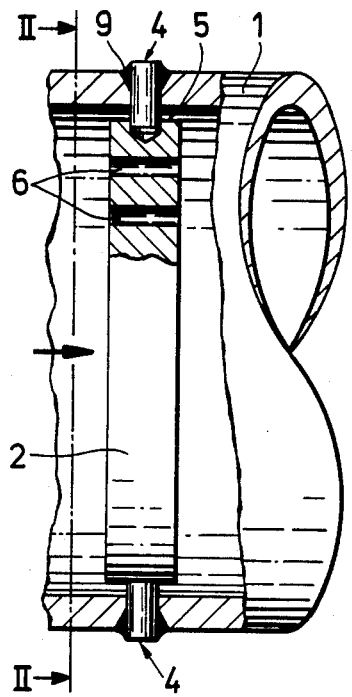
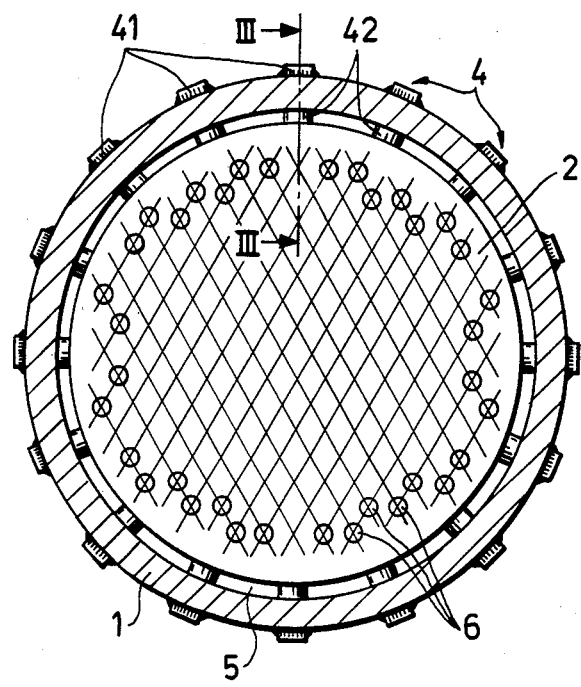
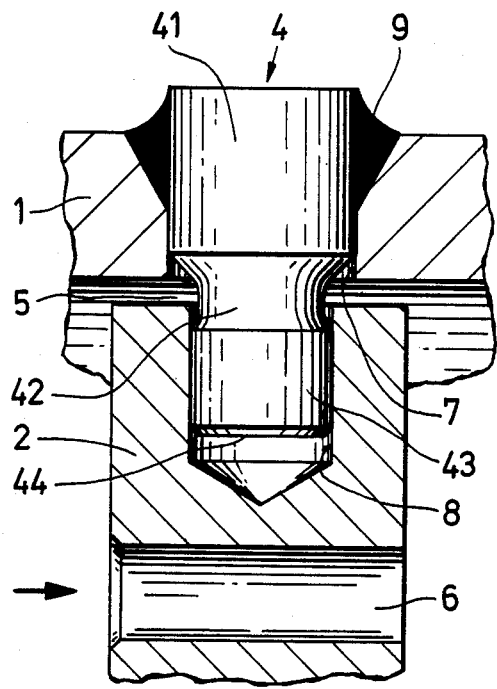

MEDIUM-CARRYING LINE HAVING AT LEAST ONE RESTRICTOR

This invention relates to a medium-carrying line having at least one restrictor. More particularly, this invention relates to the mounting of a restrictor in a medium-carrying line.

As is known, lines in which a medium is carried have been provided with restrictors for various purposes. In many cases, the restrictor has been connected within the line without any clearance, for example by welding. However, since the restrictor is generally flowed through by the medium much more intensely than is the connecting zone between the restrictor and the line, the temperature in the restrictor zone changes much more rapidly than in the connecting zone when the line is taken into operation. Consequently, the restrictor is subjected to more heat expansion or heat contraction than the line. As a result, thermal stresses arise. Further, the stresses may be considerable if the differences between the working temperature and the non-working temperature in the line are substantial. Further, the fact that the geometries of the restrictor and the line differ from one another usually helps to increase the heat expansion differences and, thus, to further increase thermal stressing.

By way of example, where a line of 600 millimeters diameter with a wall thickness of 30 millimeters is provided with a restrictor in the form of 60 millimeter thick perforated disc and is supplied, while internally cold, with steam at a temperature of 570° C. the temperature of the disc one minute after the supply of steam begins will be 570° C. However, the connection between the disc and the line will be at a temperature of only 170° C. Despite some deformation of the line in the connection zone with the disc, the resulting stresses reach average values of approximately 1000 N/mm$^2$ with stress peaks of from two to four times this amount.

Similar effects occur, for example, when the line carries a refrigerant and is flowed around externally by a hot medium, as is often the case in heat exchangers.

In a plant which is operated cyclically, for example as occurs with peak-load power stations which in some circumstances are started and stopped several times a day, another problem may arise due to the phenomenon of fatigue of the line material. This must be compensated for by a special and very expensive construction of the line and/or frequent checks and replacements.

In order to address the above problem, it has been known to preheat the connection zone between the restrictor and the line. However, there is not always sufficient time to preheat this zone. Furthermore, such a technique is very expensive.

Accordingly, it is an object of the invention to provide a simple and low cost solution to the problem of thermal stressing between a restrictor and a line in which the restrictor is mounted.

It is another object of the invention to ensure a rapid transition from a non-working state to a working state of a medium-carrying line employing a restrictor free thermal stressing It is another object of the invention to provide a relatively simple mounting of a restrictor in a medium-carrying line which substantially reduces thermal stressing in a zone between the restrictor and the line.

Briefly, the invention provides a medium-carrying line with at least one restrictor and means for securing the restrictor in the line in order to define a gap between the line and restrictor which is of a size sufficient to take up heat expansions between the restrictor and line caused by different temperatures.

By providing a gap between the restrictor and line, the heat expansion and contraction of the restrictor is not transmitted to the line. Also, in the event of a temperature change caused by the medium inside the line, the medium flowing through the gap rapidly adapts the temperatures in the zones near the gap to the temperature of the medium.

The means for securing the restrictor includes at least one pin which is fixedly mounted transversely in one of the line and restrictor while being slidably mounted in the other of the line and restrictor. In this case, a relatively simple construction is provided for securing the restrictor in place.

The means for securing the restrictor may also include a plurality of pins which are distributed peripherally about the line with the pins fixedly mounted in the line and slidably mounted in the restrictor. This construction provides a relatively simple way of reliably centering the restrictor in the line.

In order to improve the sliding properties, each pin is provided with a slide surface of a low-friction material, for example a material consisting of 75% chromium carbide and 25% chrome-nickel alloy.

The opposed surfaces of the restrictor and line which bound the gap therebetween may be disposed in parallel relation to each other. Further, the gap may be of a minimum width which is at least equal to half the thermal expansion of the restrictor in a plane parallel to the restrictor in response to the transition from a non-working temperature to the working temperature. This feature particularly ensures a reduced stressing during the takingof the line into operation.

The line may be of constant circular cross section in a zone adjacent to the restrictor or may be conical in a longitudinal direction in the zone adjacent to the restrictor. In each case, the physical construction of the line and restrictor can be readily determined and, thus, simplifies a reliable calculation of the restrictor behavior prior to use.

The restrictor may be in the form of a perforated disc or may be of a size wherein the length is many times the diameter.

The mounting of the restrictor within the line is such that the overall construction is relatively simple with corresponding cost advantages. Further, the construction can be incorporated into existing lines at relatively little cost.

These and other objects and advantages of the invention will become more apparent from the following detailed description taken in conjunction with the accompanying drawings wherein:

FIG. 1 illustrates a diagramatic view of a line having a restrictor mounted therein in accordance with the invention;

FIG. 2 illustrates a view taken on line II—II of FIG. 1; and

FIG. 3 illustrates a view taken on line III—III of FIG. 2.

Referring to FIGS. 1 and 2, the medium-carrying line has a constant circular cross section through which steam is to be carried and in which a restrictor 2 in the form of a perforated disc is mounted to throttle the flow of steam passing through the line 1. To this end, the disc 2 has a plurality of cylindrical passages 6 which extend parallel to the longitudinal axis of the line 1 and which are disposed at intersections of a line lattice as indicated in FIG. 2.

A means in the form of a plurality of pins 4, i.e. sixteen pins, secures the restrictor 2 in the line 1 in order to define a gap 5 of uniform width between the opposed surfaces of the line 1 and the restrictor 2, i.e. the inside surface of the line 1 and the periphery of the disc 2. This gap 5 is of a size which is sufficient to take up heat expansions between the restrictor 2 and the line 1 caused by different temperatures of the steam flowing through the line 1 and, particularly, at start up from a non-working state to a working state.

Referring to FIG. 3, each pin 4 is formed with a cylindrical outer part 41 which is fixedly mounted transversely of the axis of the line 1 within a bore 7 in the wall of the line 1 via a weld seam 9. This weld seam 9 provides a seal-tight connection between the pin 4 and the line 1. In addition, the outer part 41 of each pin 4 merges into a necked-down central part 42 which passes through the gap 5 and merges into a cylindrical inner part 43. This inner part 3 is slidably mounted in a bore 8 which is radially disposed in the disc 2.

The generated surface of the inner part 43 which slides within the bore 8 is made of a low-friction material, for example which consists of 75% chromium carbide ($Cr_3C_2$) and 25% of a chrome-nickel alloy. This surface may be applied, by a plasma process. As indicated in FIG. 3, the bore 8 is longer than the inner pin 43 and the pin 4 is of a size and shape such that there is a gap between the end 44 of the part 43 and the nearby closed end of the bore 8. Hence, in the event of temperature differences between the line 1 and the disc 2, the disc 2 can expand independently of the line 1 with the size of the gap 5 increasing or decreasing.

The sixteen pins 4 serve to firmly locate the disc 2 in the line 1 since any force acting lengthwise of the line 1 is received by the pins 4 and any force acting radially of the line 1 is intercepted by all those pins not extending in the direction of the radial force.

When the line 1 is initially empty and cold, for example at a temperature of 20° C. and is then flowed through abruptly by steam, for example at a temperature of 600° C., the material very near the intensely flowed-through passages 6 in the disc 2 heats up very quickly. Since the passages 6 are disposed very close together, the disc 2 heats up to 600° C. in about one minute. In this regard, the line 1 has an outer diameter of 600 millimeters and a wall thickness of 30 millimeter while the disc 2 has a thickness of 60 millimeters with passages 6 of a diameter of 25 millimeters.

Mainly because of the lower steam velocities near the wall, the line 1 has a lower heat transfer coefficient than the disc 2 and therefore heats up more slowly than the disc 2. Hence, the heat expansion of the disc 2 is initially considerably more than the heat expansion of the line 1. Another factor increasing this difference is that the line 1 is cylindrical and therefore has a radial component of heat expansion which is smaller than the radial component of heat expansion of the disc 2. However, no heat stressing occurs between the line 1 and the disc 2 because the disc 2 is free to expand in all directions, i.e. the disc 2 is able to slide relative to the pins 4 so as to reduce the size of the gap 5.

The gap 5 is initially made larger than half the radial heat expansion of the disc 2 at the maximum likely steam temperature. That is, the gap 5 is of a minimum width at least equal to half the thermal expansion of the disc 2 in a plane parallel to the disc 2.

During the flow through of the steam, the steam also flows through the gap 5. However, the flow of steam through the gap 5 accelerates temperature equalization between the disc 2, the pins 4 and the line 1 and thus ensures that excessive clearances do not arise between the inner parts 43 of the pins 4 and the respective bores 8. Consequently, consideration must be given in the construction of the disc 2 to the change of the gap 5.

As a variant of the above described embodiment, the line 1 may be conical in a longitudinal direction in at least the zone adjacent the disc 2. Alternatively, the line 1 may be of rectangular or triangular cross-section.

Although it is simpler to have a rigid connection between the pins 4 and the line 1 and a sliding connection between the pins 4 and the disc 2 from a production point of view, the connection may be reversed. That is, the pins 4 may be fixedly connected to the disc 2 and may be slidably mounted in the line 1. Further, the pins 4 can be mounted in the line 1 without extending therethrough. Indeed, if working temperatures are not very high or very low, the weld seams 9 can be omitted to facilitate assembly and demounting and the pins 4 can be slidably engaged in blind bores in the wall of the line 1. In addition, each pin may be retained by a spring which is disposed in the disc 2 between the closed end of the bore 8 and the free end 44 of the inner parts 43. In this construction, each pin is in sliding engagement both with the line 1 and the disc 2.

Alternatively, the pins 4 can be threaded into the line 1 or into the disc 2, possibly with the use of backnuts.

The number of pins 4 which are used depends on the size and upon the forces in operation.

The restrictor which is used within a line 1 may have a single passage for the through-flow of the medium instead of a plurality of passages as illustrated in FIGS. 1 and 2. Further, each passage may have the shape of a venturi nozzle. Also, the restrictor may be of a length many times its diameter and it is possible for at least two rows of pins to be provided in consecutive relationship lengthwise of the line.

The restrictor may also be retained along some of its periphery in a groove in the inner periphery of the line while being secured by a single pin diametrically opposite to the groove.

The medium which is conveyed through the line may be a heat-containing medium or may be a refrigerant. Further, the line may be internally cooled while being externally heated or vice versa.

The invention thus provides a relatively simple means of securing a restrictor within a medium-carrying line so as to reduce thermal stresses between the restrictor and the line. Further, the construction can be readily incorporated into existing lines.

What is claimed is:

1. In combination
   a medium-carrying line;
   at least one restrictor in said line; and
   means securing said restrictor in said line to define a gap thereat between said line and said restrictor of a size sufficient to take up heat expansions between said restrictor and said line caused by different temperatures, said means including a pin disposed in sliding engagement with said restrictor and fixedly mounted to said line.

2. The combination as set forth in claim 1 wherein said pin has a slide surface of low-friction material.

3. The combination as set forth in claim 1 wherein said pin has a slide surface of a material consisting of 75% chromium carbide and 25% chrome-nickel alloy.

4. The combination as set forth in claim 1 wherein said means includes a plurality of pins distributed peripherally about said line, said pins being fixedly mounted in said line and slidably mounted in said restrictor.

5. The combination as set forth in claim 1 wherein said line and said restrictor have opposed surfaces bounding said gap and disposed in parallel relation to each other.

6. The combination as set forth in claim 1 wherein said gap is of a minimum width at least equal to half the thermal expansion of said restrictor in plane parallel to said restrictor.

7. The combination as set forth in claim 1 wherein said line is of constant circular cross-section in a zone adjacent said restrictor.

8. The combination as set forth in claim 1 wherein said line is conical in a longitudinal direction in a zone adjacent said restrictor.

9. The combination as set forth in claim 1 wherein said restrictor is a perforated disc.

10. In combination,
a medium-carrying line;
a restrictor in said line for throttling a flow of medium passing through said line; and
a plurality of pins securing said restrictor in said line with a peripheral gap between said restrictor and said line, said pins being slidably mounted in said restrictor and fixedly mounted in said line to accommodate a differential heat expansion between said restrictor and said line.

11. The combination as set forth in claim 10 wherein said restrictor is a perforated disc.

12. The combination as set forth in claim 10 wherein each pin has a sliding surface of low-friction material mounted in said one of said restrictor and said line.

13. In combination
a medium-carrying line;
at least one restrictor in said line for throttling a flow of medium through said line; and
means securing said restrictor in said line for relative transverse movement therebetween and to define a gap between said line and said restrictor of a size sufficient to take up heat expansions between said restrictor and said line caused by different temperatures, said means including a pin disposed in sliding engagement with said restrictor and fixedly mounted to said line.

14. The combination as set forth in claim 13 wherein said restrictor is a perforated disc.

* * * * *

UNITED STATES PATENT AND TRADEMARK OFFICE
CERTIFICATE OF CORRECTION

PATENT NO. : 4,665,950

DATED : May 19, 1987

INVENTOR(S) : Walter Fruh

It is certified that error appears in the above-identified patent and that said Letters Patent is hereby corrected as shown below:

Column 3, line 3 "oarallel" should be -parallel-

Column 3, line 20 "orovides" should be -provides-

Column 3, line 33 "nearbv" should be -nearby-

Column 3, line 34 "temoerature" should be -temperature-

Column 4, line 5 "fows" should be -flows-.

Signed and Sealed this

Twentieth Day of October, 1987

Attest:

DONALD J. QUIGG

Attesting Officer

Commissioner of Patents and Trademarks